United States Patent [19]

Moriyama et al.

[11] Patent Number: 5,065,012
[45] Date of Patent: Nov. 12, 1991

[54] MOVEMENT DETECTING DEVICE

[75] Inventors: Norio Moriyama; Kazuhiko Kawakami, both of Katsuta, Japan

[73] Assignee: Hitachi, Ltd., Tokyo, Japan

[21] Appl. No.: 466,206

[22] Filed: Jan. 17, 1990

[30] Foreign Application Priority Data

Jan. 17, 1989 [JP] Japan .................................. 1-006026

[51] Int. Cl.⁵ .............................................. G01D 5/34
[52] U.S. Cl. .............................................. 250/231.14
[58] Field of Search ................... 250/231.13, 231.14, 250/231.15, 231.16, 231.17, 231.18, 237 G; 356/395; 33/707

[56] References Cited

U.S. PATENT DOCUMENTS

| | | | |
|---|---|---|---|
| 3,770,971 | 11/1973 | Somerset | 250/231.16 |
| 3,886,354 | 5/1975 | Swiden | 250/231.14 |
| 4,492,861 | 1/1985 | Kebschull et al. | |
| 4,536,649 | 8/1985 | Kozai et al. | 250/231.14 |
| 4,628,200 | 12/1986 | Tinios | 250/231.16 |

FOREIGN PATENT DOCUMENTS 159211 2/1983 German Democratic Rep. .

*Primary Examiner*—David C. Nelms
*Attorney, Agent, or Firm*—Ladas & Parry

[57] ABSTRACT

A movement detecting device having a light transmitter 44 and a spaced light receiver 46, with a moving plate 32 containing slit apertures therein being positioned between the transmitter and receiver for interrupting the light path between the transmitter and the receiver in dependence upon the motion of the moving plate. So as to improve the clarity of light detection, stationary apertured plates 56U, 56D are unitarily formed and are positioned on respective sides of the moving plate and adjacent a respective one of the transmitter or receiver. The stationary apertured plates 56U, 56D may be formed from a single sheet of material (FIG. 18), or from two separate sheets connectingly joined by a flanged pin (FIG. 12), or a combination thereof. The unitarily formed stationary apertured plates 56U, 56D may be directly molded into a support housing (38, 60, 62 in FIG. 8) with locating holes 64, 66 for the light transmitter 44 and light receiver 46, or may be formed in a molded sub assembly (FIG. 5) prior to moulding into a support housing (FIGS. 4 and 7).

20 Claims, 10 Drawing Sheets

MOVEMENT DETECTING DEVICE

BACKGROUND OF THE INVENTION

1. Field of the Invention

The present invention relates to a movement detecting device for detecting amount of movement or speed of movement, and especially relates to a detecting device using light transmitting and receiving elements.

2. Description of Related Art

Movement detection devices for generally detecting a movement amount such as distance and/or angle, or speed of movement such as rectilinear velocity (acceleration) and angular velocity (acceleration), are known and take various forms, but those using light transmitting and light receiving elements such as photo-electric elements are widely used in environments where electromagnetic noise frequently occurs.

A typical and well-known example of a movement detection device using a photo-electric element is a rotation speed detection device having a structure as shown in Japanese Patent Provisional Publication No. 59-126913 (1984).

In such a rotation speed detection device, an electric light emitting element and a light receiving element are arranged in opposing relation to one another, therebetween is placed a moving plate having light-transmitting slits, and changes between bright and dark of the light from the light emitting element transmitted through the light-transmitting slits is converted into a voltage at the light receiving element and rotational speeds thereby detected.

As will be appreciated by those skilled in the art, apart from rotation speed it is also possible to detect revolution angle from a base angle position. Further, in a flow regulating valve for regulating fluid flow, the opening angle of the flow regulating valve may be detected in the same manner and used as a control parameter.

In such movement detection devices, it is necessary to arrange a pair of stationary apertured plates, i.e. also provided with light-transmitting slits, between the light emitting element and the light receiving element so that the moving slit plate passes between the stationary plates. By such an expedient better reliability of results is achieved since the light is concentrated to a smaller area between the light transmitter and light receiver.

In such prior art devices, each stationary apertured plate is separately fixed in a support member that holds the light emitting element or the light receiving element respectively by supersonic caulking. That is, the support member for holding the light receiving element or the light emitting element is formed by a thermal plastic synthetic resin, and supersonic caulking is carried out by providing projections at a part of the synthetic resin and inserting the projections into stationary holes formed on the stationary apertured plates.

However, with this kind of fixing structure, the stationary apertured plates tend to become displaced due to the synthetic resin melting during the supersonic caulking procedure. Additionally, the stationary apertured plates tend to move up and down due to vibration during measurements if the projections upon which the plates are located is not completely crushed during caulking. Alignment accuracy of the light-transmitting slits of the stationary apertured plate of the light emitting element and the stationary apertured plate of the light receiving element is thus worsened, and accurate signals may not be detected. Detection accuracy is also worsened if the stationary apertured plates move away from the associated light emitting element or the light receiving element so that the light becomes defused, thereby causing a decrease in light intensity, resulting in accurate signals not being detected.

Furthermore, in the prior art the support member that holds the light receiving element and that which holds the light emitting element are formed in separate structures to facilitate the supersonic caulking. In assembly there is a tendency for displacement between both support members since both the support members are joined together by screws. This also diminishes alignment accuracy of the light-transmitting slits of the stationary apertured plates, so accurate signals can not be detected. In this respect, when alignment accuracy of the light-transmitting slits is worsened, although signals may be generated, the controller which receives the signals often determines there to be a no signal condition which leads to serious misoperation and may cause problems in the equipment designed to use the controller's output signals.

An object of this invention is to provide a movement detection device with improved alignment accuracy of the apertures in the stationary apertured plates associated with the light emitting element and the light receiving element respectively.

Another object of the present invention is to provide a movement detection device which firmly fixes the stationary slit plates with an improved alignment.

Still another object of the present invention is to provide a movement detection device in which the stationary slit plates with an increased alignment and the holding part for holding the light receiving and the light emitting elements are firmly and accurately assembled.

Still another object of the present invention is to provide an internal combustion engine or fluid regulating flow detector having an improved structure for signal resolution performance.

SUMMARY OF THE INVENTION

According to one aspect of this invention in a movement detecting device comprising a light transmitter and a light receiver spaced therefrom, a stationary apertured plate is associated with the light transmitter and the light receiver respectively, said stationary apertured plates being mounted in a body and an apertured movable plate interposed between the stationary apertured plates, the improvement wherein the stationary apertured plates are unitarily connected together prior to mounting in said body.

Preferably the stationary apertured plates are integrally formed from a single sheet of material and conveniently said stationary apertured plates are formed into a U-shape.

In an alternative embodiment two discrete stationary apertured plates are unitarily secured together by at least one pin having a flange defining the spacing between said apertured plates. In yet another alternative embodiment at least one pin having a flange defining the spacing between the apertured plates is provided. In said alternative embodiments, preferably a portion of said at least one pin is swaged over part of an outer surface of each apertured plate to thereby secure said aperture plates together, although said apertured plates may be secured to said pin by one of welding, epoxy adhesive, and by pressure rings located about the pin for forcing said apertured plates on to said flange.

Conveniently each said apertured plate is substantially rectangular in shape and two pins are located at adjacent corners of each said apertured plate.

Advantageously the apertured plates each have outwardly turned flanges extending away from the opposing apertured plate and the flanges have cut outs therein for assisting in bonding said associated apertured plate to the body, which said body is molded over said flanges.

Preferably the apertured plates have a plurality of holes in the major surfaces thereof for relaxing strain when said apertured plates are molded into said body.

In one embodiment a sub assembly is formed by said unitarily assembled apertured plates and a molded body over the outer surface of said apertured plates, and said body has location apertures for locating the light transmitter and the light receiver respectively. Preferably the sub assembly is molded in a support housing.

In an embodiment more than one light transmitter and associated light receiver is provided, each light transmitter and light receiver having associated sets of apertures in the stationary apertured plates and movable plate.

In a currently preferred embodiment the movable plate is pivoted to be at least partially rotatable.

Advantageously the spacing between the apertured plates is only sufficient to permit movement of said movable plate.

According to another aspect of this invention there is provided a pair of apertured plates which are unitarily assembled together prior to fixing in a support body for use in a movement detecting device having a light transmitter, a light receiver spaced from the light transmitter, and a movable plate arranged to be interposed between said apertured plates.

The device of said one aspect may be used in an internal combustion engine ignition distributor or a fluid regulating flow device.

BRIEF DESCRIPTION OF THE DRAWINGS

The invention will now be described by way of example with reference to the accompanying drawings in which.

In the figures like reference numerals denote like parts.

DESCRIPTION OF PREFERRED EMBODIMENTS

Figure 1:
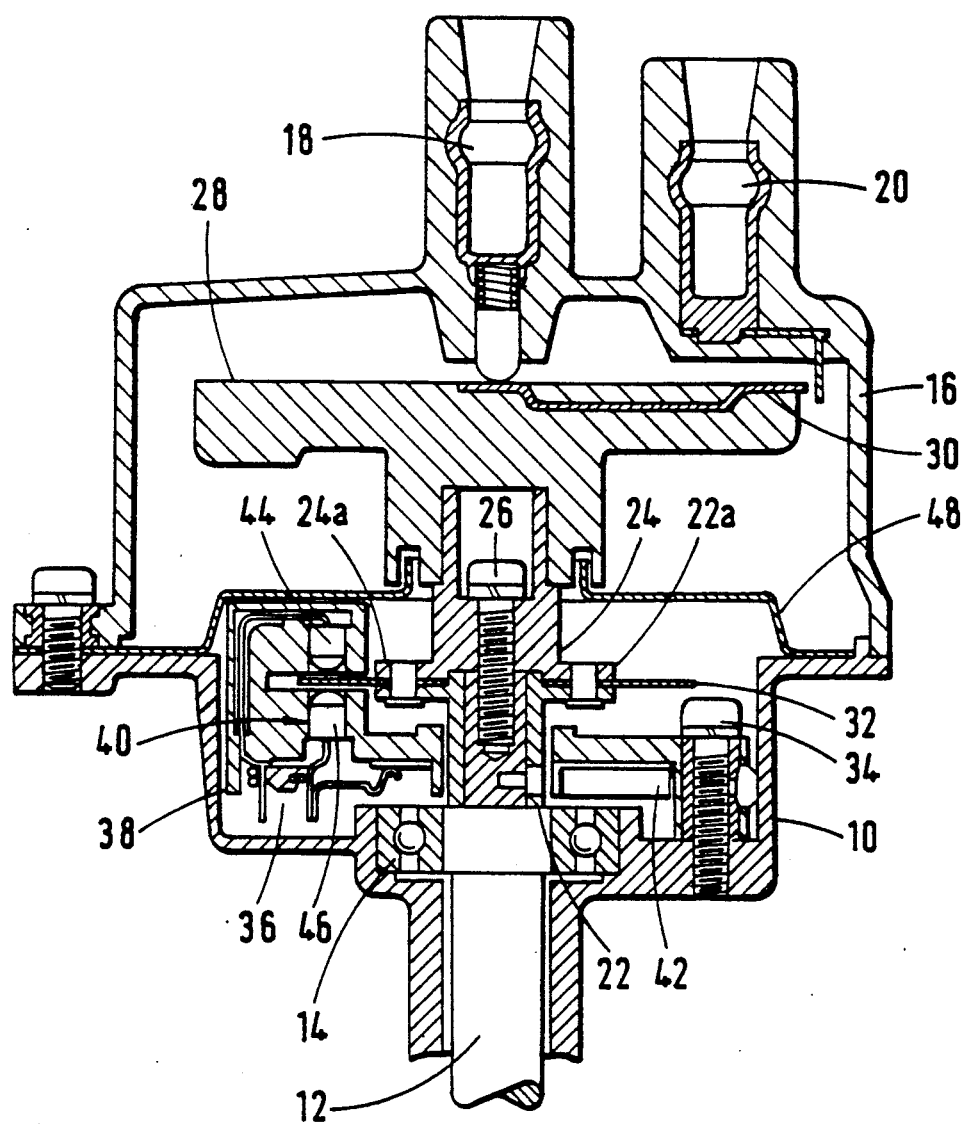
FIG. 1 is a cross-sectional view of a rotation speed detection device according to one embodiment of the present invention.

FIG. 1 shows a structure of a revolution speed detecting device as an example of a movement detecting device.

A casing 10, in the shape of a cup, formed of light metal such as aluminum is fixed to an engine body (not shown) by, for example, bolts.

A rotary axle 12 protrudes inside the casing 10 and is rotated by the engine and a ball bearing 14 interfaces between the casing 10 and the rotary axle 12 to facilitate smooth rotation of the rotary axle 12.

A cap 16 forming a distributor is fixed on the upper part of the casing 10, and a central electrode 18 and a number of side electrodes 20 corresponding to the number of cylinders of the engine are formed in the cap 16.

A first collar 22 is attached on the end of the rotary axle 12, and a second collar 24 is arranged opposite to the first collar 22. Both collars 22 and 24 are firmly fixed on the rotary axle 12 by a bolt 26.

A rotor base table 28 is engaged in an end part of the second collar 24, and an electrical path is formed from the central electrode 18 to the side electrodes 20 by a rotor electrode 30 fixed on the upper part of the table 28. Accordingly, an induced high voltage from an ignition coil (not shown) can be impressed on the central electrode 18 and impressed on an ignition plug (not shown) through the rotor electrode 30 and the side electrodes 20.

A rotary disk 32 is sandwiched between flanges 22a and 24a of the first collar and the second collar, and light-transmitting slits are provided on this rotary disk 32 at 1° intervals.

A detector unit 36 is fixed on the casing 10 by a bolt 34.

A clearance hole through which the rotary axle 12 penetrates is formed in the detector unit 36, and a support member or housing 38 is formed on the outer peripheral portion of unit 36. A photo-electric element assembly 40 is held by the support member, and a detection processing circuit 42 composed of a hybrid IC is provided near the clearance hole.

The photo-electric element assembly 40 includes a light emitting element 44 such as a LED, a light receiving element 46, and the lead terminals associated therewith. When the rotary disk 32 passes between both elements, the light-transmitting slits in the disk cause the light to be transmitted and then interrupted.

The detector unit 36 and the rotary disk 32 are protected by a shield plate 48.

Specific embodiments of the present invention will now be explained.

Figure 2:
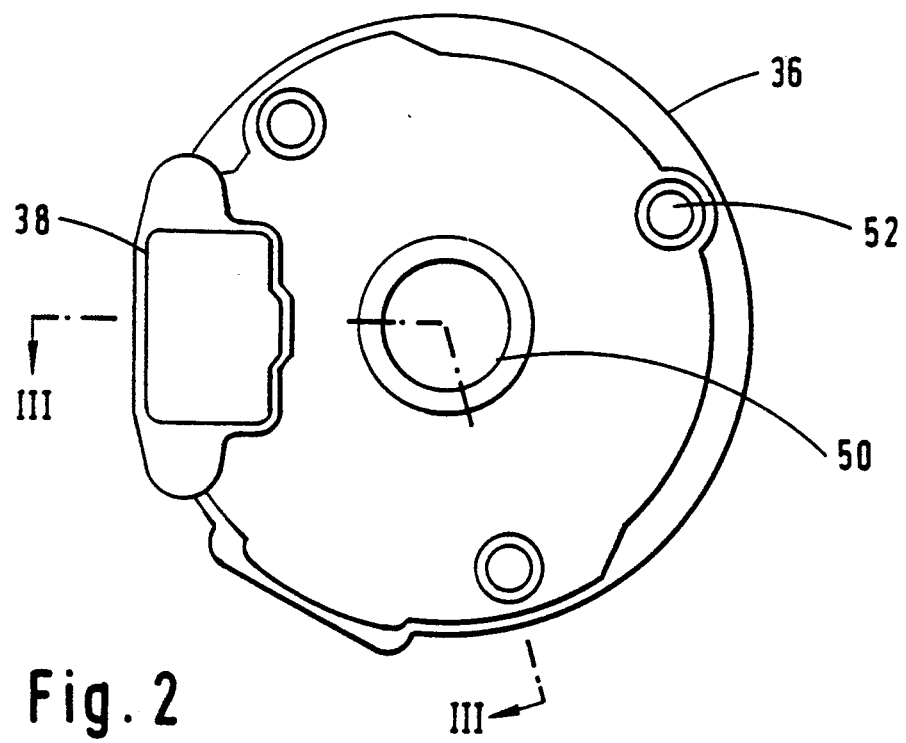
FIG. 2 is a plan view of a detection unit.
Figure 3:
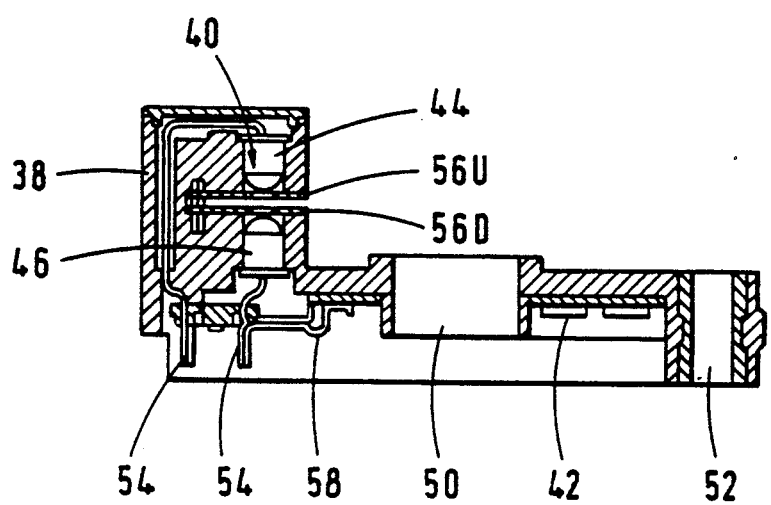
FIG. 3 is a cross-sectional view along double arrow-headed line III—III of FIG. 2.

FIG. 2 is a plan view of the detector unit 36 and FIG. 3 is the cross-sectional view along the double arrow-headed line III—III of FIG. 2.

In FIGS. 2 and 3, the detector unit is formed in an approximately circular shape, and provided with an axial clearance hole 50 for the axle 12, tapped holes 52 for installation and the support member 38 at the outer peripheral portion thereof.

The support member 38 is provided with a photoelectric element assembly 40 including the light emitting element 44, the light receiving element 46 and lead terminals 54 and stationary apertured plates 56U and 56D for improving the resolution of the light produced by the light emitting element and received by the light receiving element. The lead terminals 54 are connected to the detection processing circuit 42 by lead wires 58. The apertures in the plates 56U, 56D are usually also narrow slits.

Figure 4:
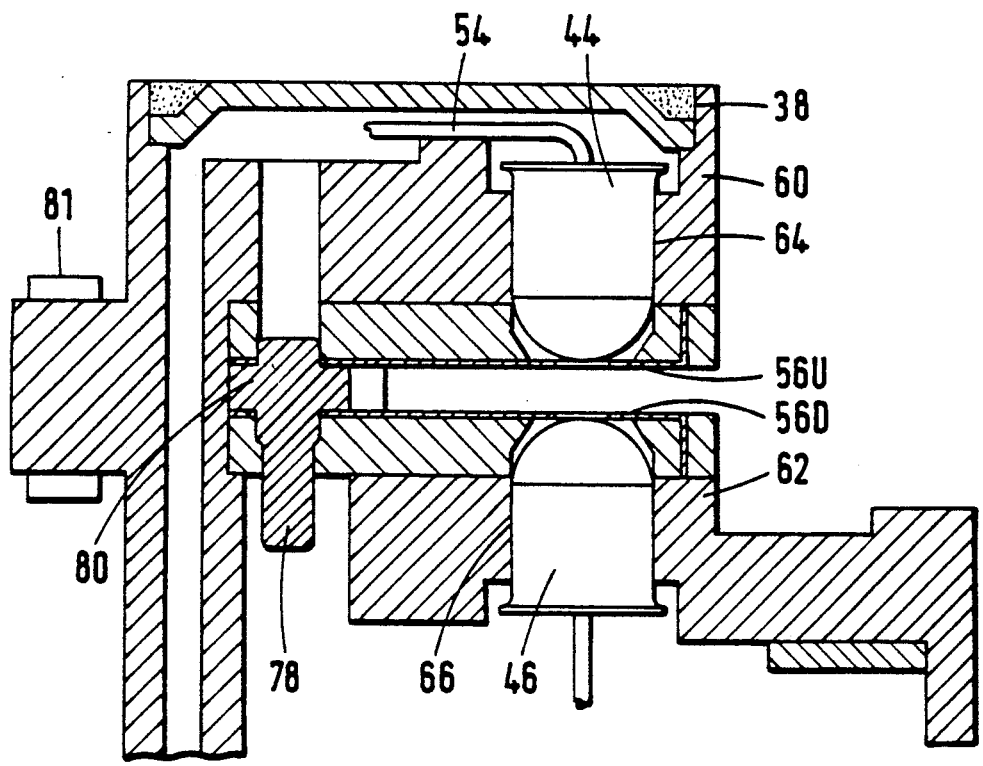
FIG. 4 is a cross-sectional view illustrating a first embodiment of a support member.
Figure 5:
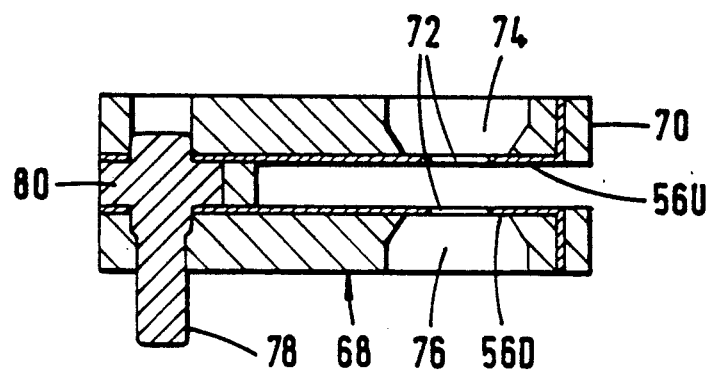
FIG. 5 is a cross-sectional view of a stationary apertured plate sub-assembly.

Next, the details of the support member 38 will be explained. In FIG. 4, the support member 38 is formed by a first support body 60 and a second support body 62, and a mounting hole 64 for the light emitting element 44 is formed in the first support body 60 and a mounting hole 66 for the light receiving element 46 is formed on the second support body 62. A sub-assembly, described below with reference to FIG. 5, is sandwiched between the first support body 60 and the second support body 62. The second support body 62 occupies a substantial part of the detector unit 36.

Referring to FIG. 5, a unitarily formed stationary apertured plate assembly (described hereinafter), is formed into a sub-assembly 68 by forming the stationary apertured plate 56U on the light emitting element 44 side and the stationary apertured plate 56D on the light receiving element 46 side unitarily with one another and molding the plates 56U, 56D in a body 70 made of synthetic resin over the external surfaces of the plates. Locating holes 74 and 76 for the light emitting element 44 and the light receiving element 46 respectively are formed adjacent to the light-transmitting slits 72 provided in the stationary apertured plates 56U and 56D. These locating holes 74 and 76 are made to align with the mounting holes 64 and 66 of the support bodies 60 and 62.

Also, both of the stationary apertured plates 56U and 56D are fixed and joined by a flange 80 of a pin 78, the flange defining the spacing between the plates 56U, 56D. Accordingly, when producing the stationary apertured plate sub-assembly 68, after the stationary apertured plates 56U and 56D are fixed to the flange 80 of the pin 78 (the assembly), they are placed in a metal jig, and the molded body 70 is formed by pouring synthetic resin excluding at least the part of the light-transmitting slits 72. Adhesion of the synthetic resin is improved by using thermosetting resins.

Figure 6:
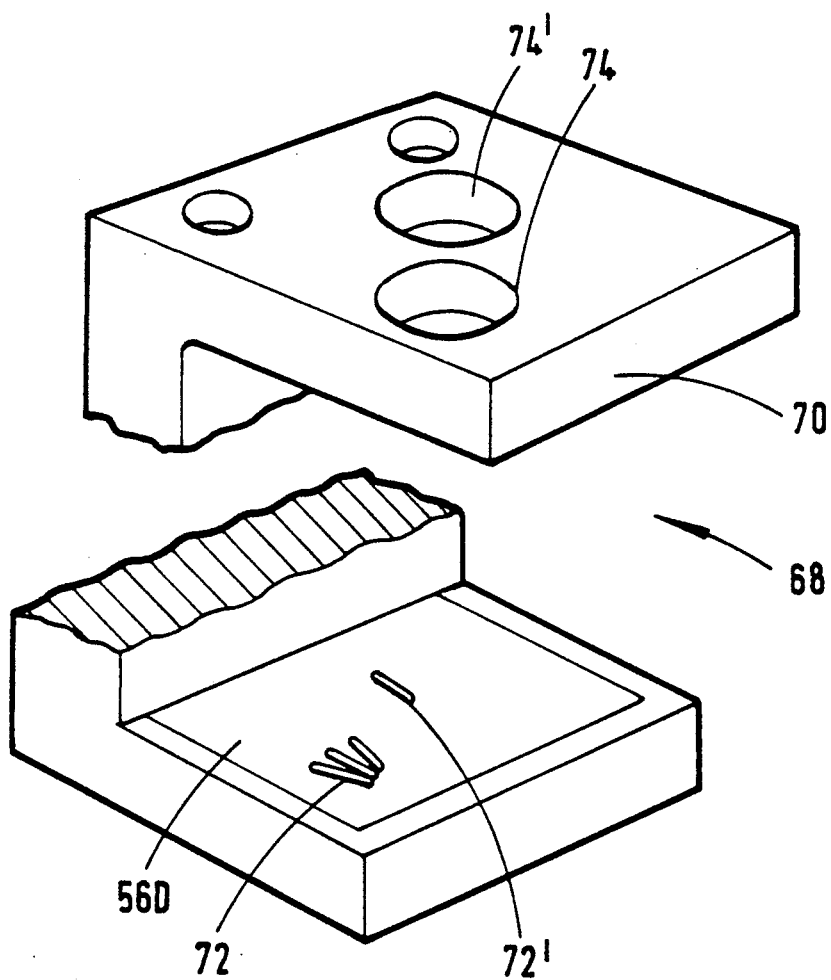
FIG. 6 is a perspective view of the stationary apertured plate sub-assembly.

The overall shape of the stationary apertured plate sub-assembly 68 is as shown in FIG. 6, having locating holes 74, 74' for mounting two LED's associated with sets of slits 72, 72' respectively, each set of slits producing different periodic signals, e.g. slit 72 being for producing positional signals and slit 72' being for producing reference signals. The stationary apertured plate assembly is mounted in the first support body 60 and the second support body 62 which are assembled and joined with a screw 81, as shown in FIG. 4.

Accordingly, because the installation positions of the stationary apertured plate 56U on the light emitting element 44 side and the stationary apertured plate 56D on the light receiving element 46 side are pre-defined in an assembly and unitarily joined by synthetic resin in a sub-assembly, so alignment of the light-transmitting slits 72 of both stationary apertured plates 56U and 56D is improved, and accurate signals may therefore be detected.

Also, in the present invention, because the stationary apertured plates 56U and 56D are not secured by the conventionally used supersonic caulking, so conventionally provided padding is eliminated, and the stationary apertured plates 56U and 56D are disposed closer to each other. Accordingly, it becomes possible to make the gap between the stationary apertured plates as close as possible depending upon the maximum fluctuation movement of the moving plate 32. If low friction materials are used, the moving plate may, it is envisaged, frictionally contact with the stationary apertured plates. Moreover, because the LED and light receiving element can be positioned closer together so the intensity of the received light is increased, and clearer signals are thus obtained.

Figure 7:
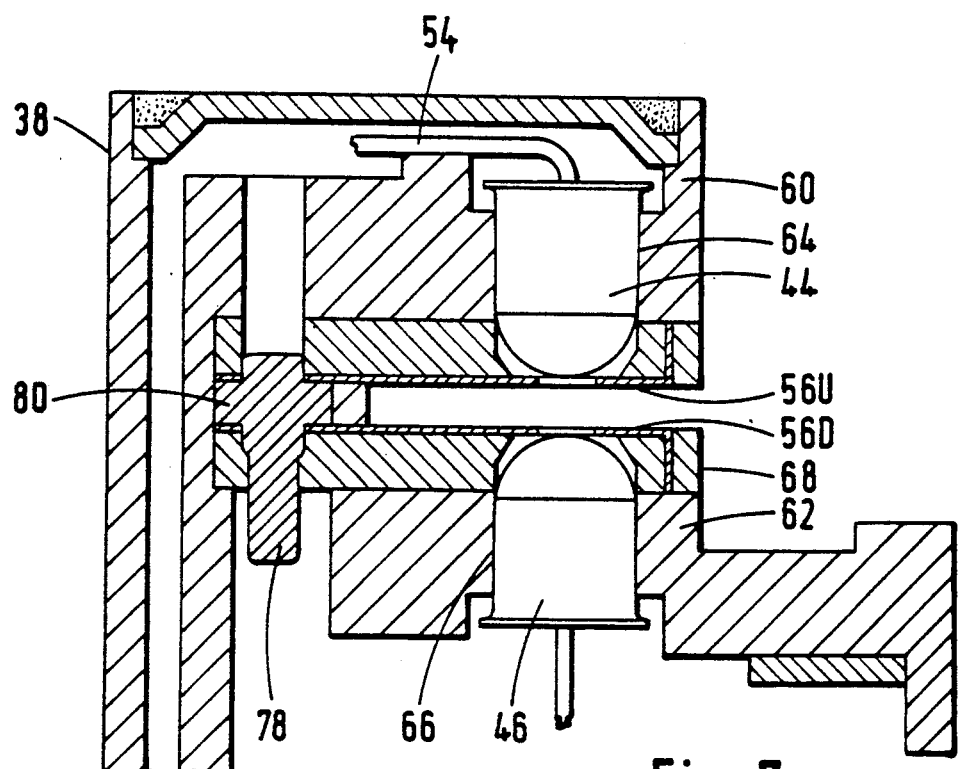
FIGS. 7 and 8 are cross-sectional views illustrating second and third embodiments of a support member.

Referring to FIG. 7, this shows an example of forming the first support body 60 and the second support body 62, which in the embodiment of FIG. 4 were separate bodies, into a single body of synthetic resin.

In FIG. 7, the unitary stationary apertured plate sub-assembly 68 is pre-assembled and molded in a body of synthetic resin as shown in FIG. 5 to form a sub-assembly. The stationary apertured sub-assembly 68 of FIG. 5 is placed in a metal jig and molded by pouring synthetic resin to form the support member 38 and integral support bodies 60, 62.

Accordingly, also in the embodiment of FIG. 7 the installation positions of the stationary apertured plate 56U on the light emitting element 44 side and the stationary apertured plate 56D on the light receiving element 46 side are defined in advance and joined by synthetic resin in a sub-assembly. Moreover, the pre-formed stationary apertured plate sub-assembly 68 is joined with the synthetic resin forming the support member 38 that holds the light emitting element 44 and the light receiving element 46. Thus, alignment of the light-transmitting slits 72 of both stationary apertured plates 56U and 56D is improved, and accurate signals may be detected.

Another embodiment of the present invention will now be explained with reference to FIG. 8 which shows an example of simultaneously molding the first support body 60 and the second support body 62 as well as the molded body 70 of the unitarily formed stationary apertured plate assembly into a support housing using synthetic resin.

Figure 8:
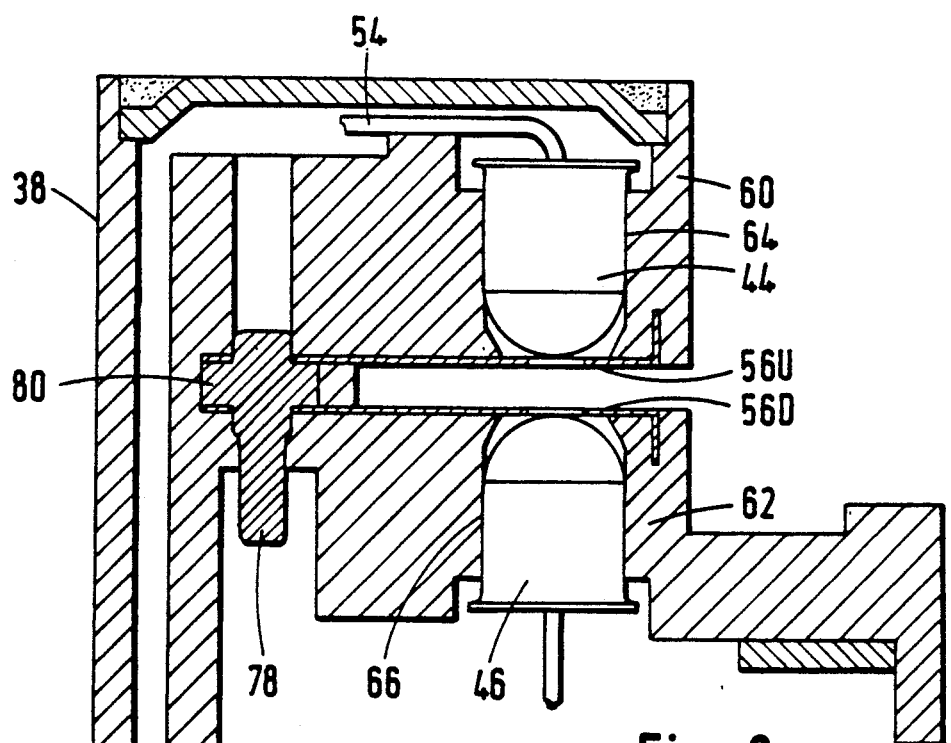
Figure 10:
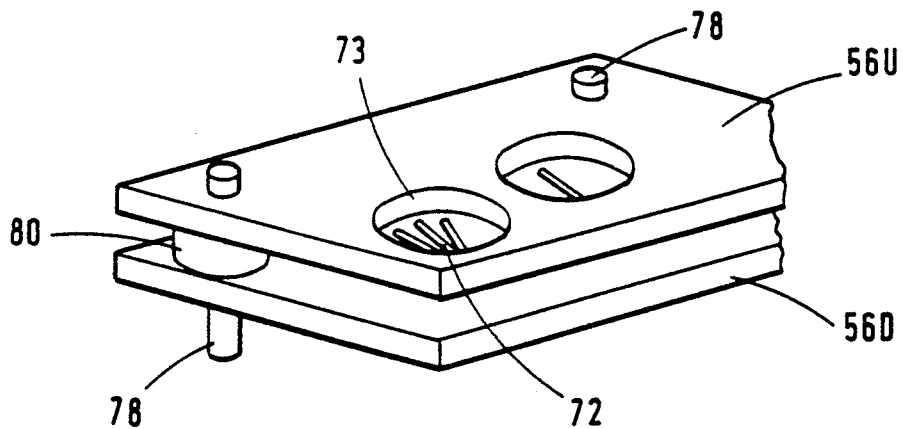
Figure 11:
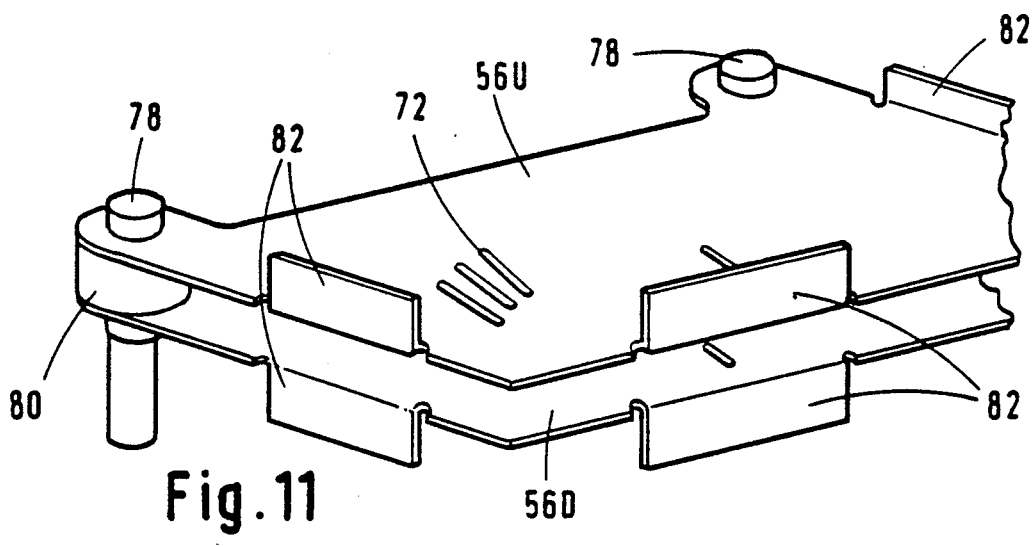
FIGS. 11 and 12 are perspective views of different forms of stationary apertured plate assemblies unitarily joined together, FIGS. 13, 14, 15, 16 and 17 respectively show cross-sectional views of differing fixing structures of the stationary apertured plates with a flanged pin.

In the embodiment of FIG. 8, the stationary apertured plates 56U and 56D are unitarily pre-formed into an assembly by joining together with two pins 78, as shown in FIGS. 10 and 11. The assembled stationary apertured plates 56U and 56D and pins 78 are thus surrounded and joined by poured synthetic resin that forms the support member 38.

Thus in this embodiment, because the stationary apertured plates 56U and 56D are pre-assembled before being embodied in the synthetic resin support member 38, so coordination of the light-transmitting slits 72 of both stationary apertured plates 56U and 56D is improved, and accurate signals may be detected.

Figure 9:
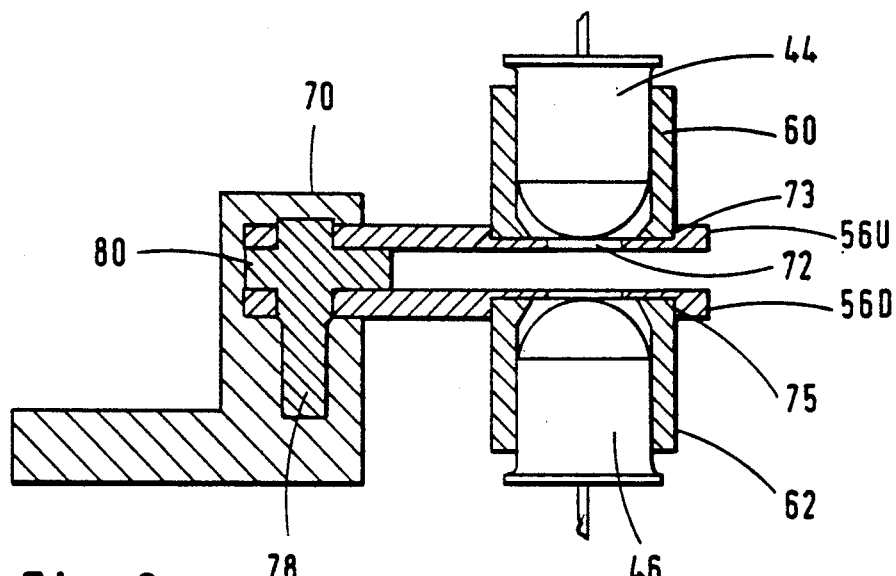
FIGS. 9 and 10 are a cross-sectional view and a partial perspective view respectively of a fourth embodiment of the support member.

FIGS. 9 and 10 show another embodiment of the present invention.

In FIGS. 9 and 10, the stationary apertured plates 56U and 56D are formed by a relatively thick material for example, approximately 0.1 mm to 1.0 mm. Receiving holes 73 and 75 for the LED and light receiver respectively are provided by boring the part over the light-transmitting slits 72, and the support bodies 60 and 62 are positioned in the receiving holes 73 and 75. The stationary apertured plates 56U and 56D are pre-assembled by the two pins 78, the flange 80 defining the spacing between the plates 56U and 56D, and are then molded in the body 70.

Accordingly, also in this embodiment, because the stationary apertured plates 56U and 56D are pre-assembled, alignment of the light-transmitting slits 72 is improved, and accurate signals may be detected.

The stationary apertured plate assembly will now be explained.

In FIG. 11, the stationary apertured plates 56U and 56D are approximately rectangularly shaped and are fixed to the pins 78 at two adjacent corners. Flanges 82 are formed on the three remaining sides of the stationary apertured plates 56U and 56D so that the flanges can be encased in synthetic resin, thereby improving the fixing force.

Figure 12:
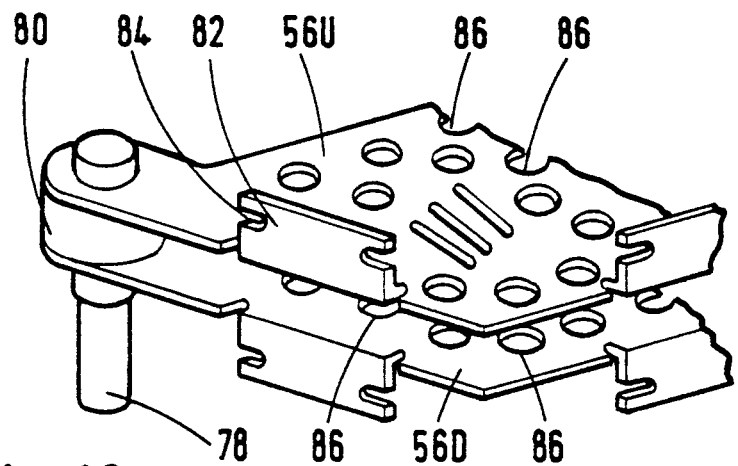

Referring to FIG. 12, cut outs 84 in opposing sides of the flanges 82 are provided and a plurality of holes 86 for relaxing strain are formed in the stationary apertured plates 56U and 56D.

The cut outs 84 render firm fixation possible since synthetic resin penetrates thereinto when they are buried in the synthetic resin. The holes 86 enable contraction strain of the synthetic resin to be relaxed, and reduce warping in the stationary apertured plates 56U and 56D.

Figure 13:
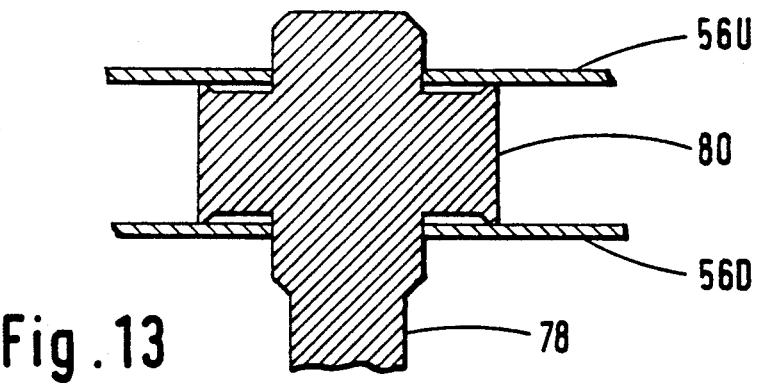
Figure 14:
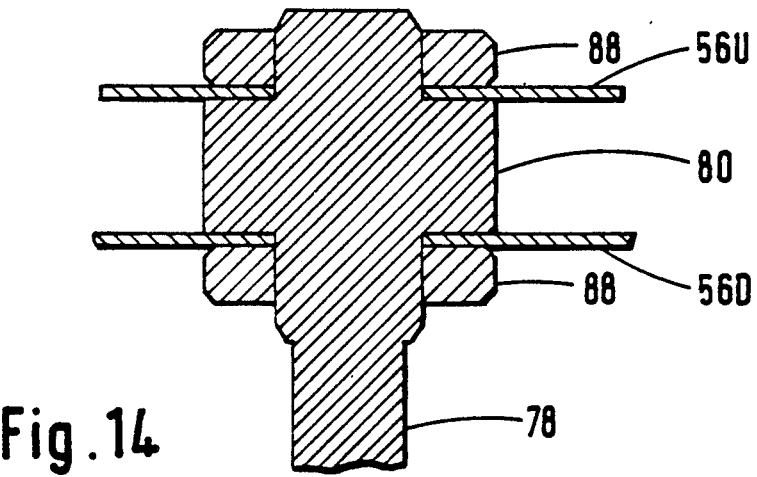
Figure 15:
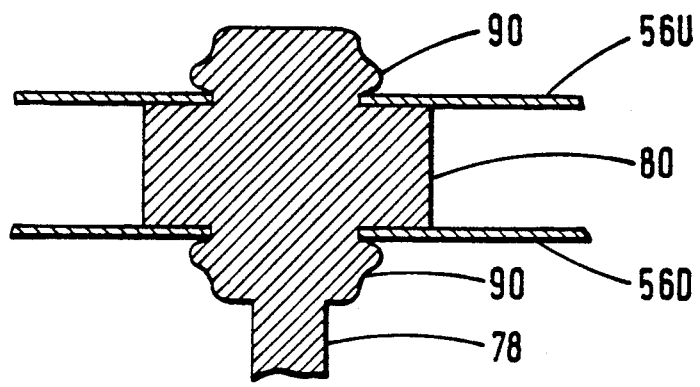
Figure 16:
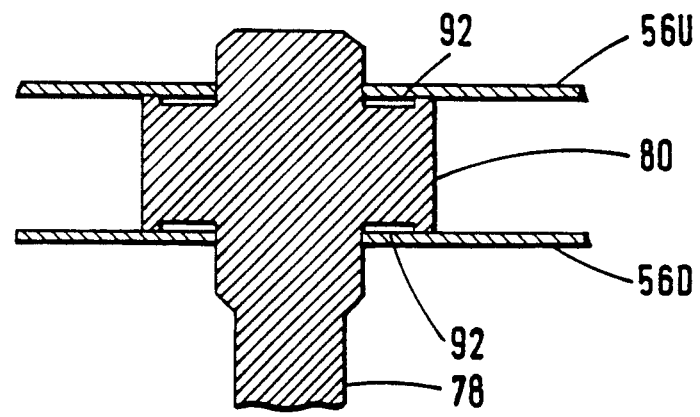
Figure 17:
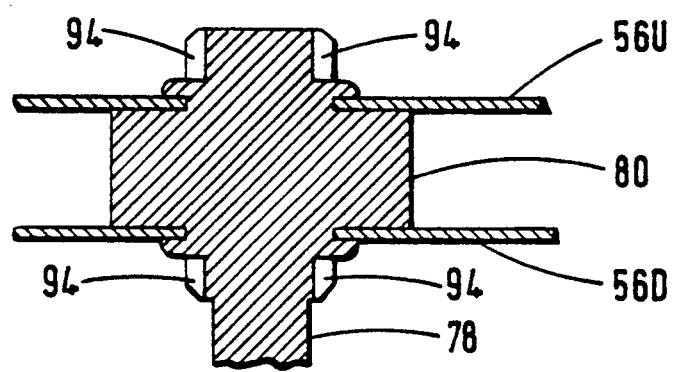

FIG. 13 to FIG. 17 show the fixing structure of the unitary assembly of the stationary apertured plates 56U, 56D and the pins 78. FIG. 13 is an example of projection welding the stationary apertured plates 56U and 56D and the flange 80 of the pin 78. FIG. 14 is an example of fixing the stationary apertured plates 56U and 56D by the flange 80 and pressure rings 88. FIG. 15 is an example of fixing the stationary apertured plates 56U and 56D by a circumferential swaging portion 90 and the flange 80 of the pin 78. FIG. 16 is an example of fixing the stationary apertured plates 56U and 56D on the flange 80 by an epoxy adhesive 92. Finally, FIG. 17 is an example of fixing the stationary apertured plates 56U and 56D by partial swaging portion 94 and the flange 80 of the pin 78.

Various fixing structures have been shown above, but suitable fixing structures may be selected and adopted according to needs.

Figure 18:
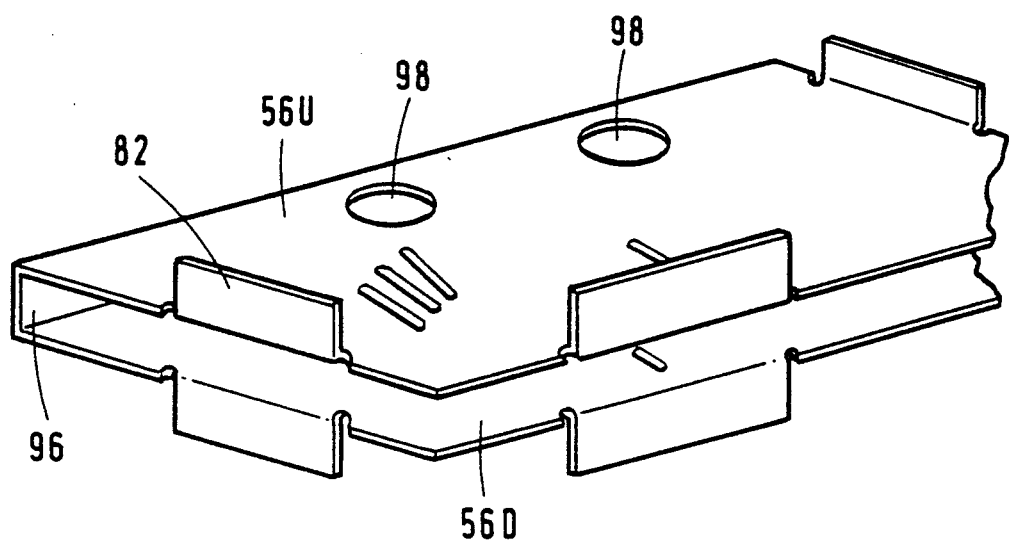
FIG. 18 is a perspective view illustrating another structure for the unitarily formed stationary apertured plates.

FIG. 18 shows a unitary stationary apertured plate construction where the pin 78 is omitted.

In FIG. 18, a metal sheet is bent into a U-shape by a press, and the stationary apertured plates 56U and 56D are connectingly joined by a side wall 96. The small holes 98 are provided as positioning holes for the metal jig when the synthetic resin is poured.

Figure 19:
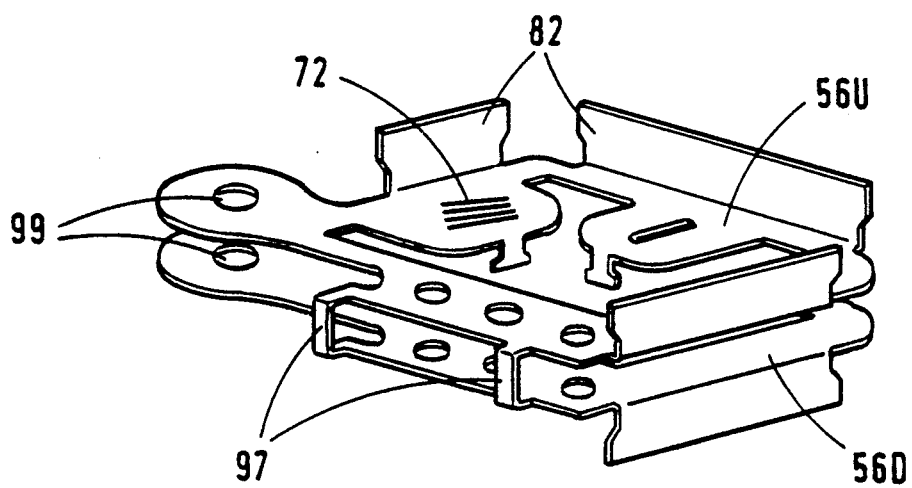
FIG. 19 is a perspective view of yet another structure for the unitarily formed apertured plates.

FIG. 19 shows a stationary apertured plate assembly formed by two planar slit plates 56U, 56D joined by two edge portions 97, the plates and edge portions being formed from a single sheet of material, and a flanged pin (not shown) is inserted through holes 99 to more clearly define the spacing between the slit plates and to more accurately locate the relative positions of the slits in each plate with respect to one another, the flange of the pin assisting to define the spacing between plates 56U, 56D.

An example of applying the detector unit of the present invention to a flow regulating valve will now be explained.

Figure 20:
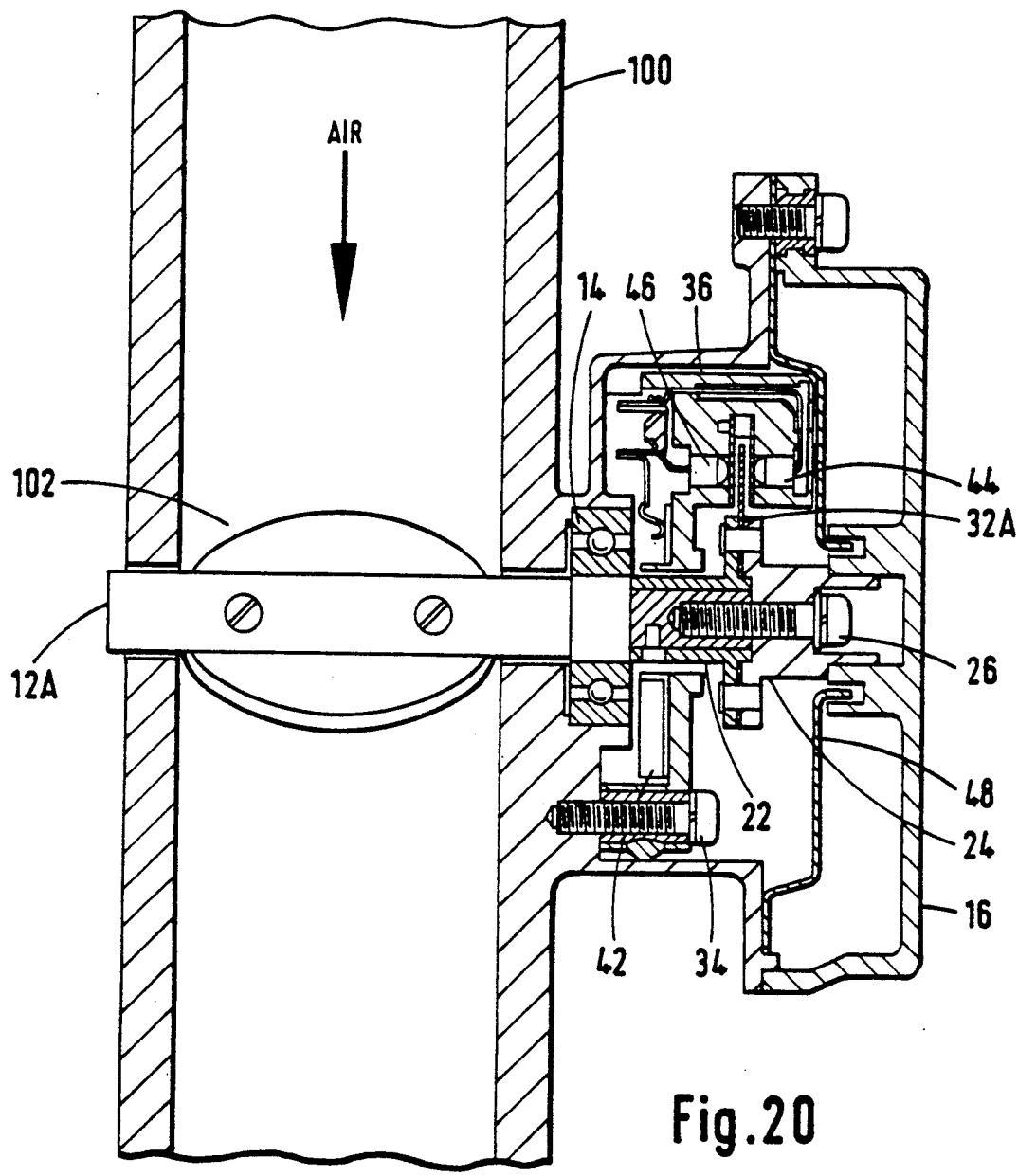
FIG. 20 is a cross-sectional view of a flow regulating valve.

FIG. 20 shows a structure where the present invention is applied to a flow regulating valve which shows a throttle valve device for regulating air flow taken into an internal combustion engine.

In FIG. 20, a throttle valve 102 is arranged at an intake air passage 100, and the throttle valve 102 is fixed on a rotatable axle 12A. The throttle valve is normally opened and closed by a driver and regulates air flow.

Figure 21:
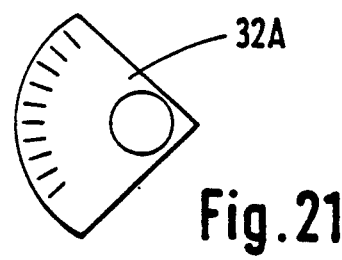
FIG. 21 is a plan view of a moving plate.

The detector unit 36 is substantially the same as described in the above-mentioned embodiments, but differs in that rotary disk 32A is approximately quadrant shaped, as shown in FIG. 21. This is because the throttle valve displaces less than 90°.

With such a device detecting valve 102 opening, angular motion from which may be determined opening angular velocity, an apparatus for correcting fuel increase during acceleration or for correcting fuel amount during a high fuel flow region of operation may be constructed.

The embodiments of the present invention that have been explained as above are to be considered exemplary only and the present invention is widely applicable to devices for detecting speed, acceleration, amount of movement, etc. and the invention is not to be limited to the rotation speed detection device and flow regulation device herein described by way of example.

It is also envisaged that the present invention may be applied to linear motion detectors and is not to be limited to rotational detectors.

It is additionally to be understood that other modifications could be made and that all such modifications falling within the spirit and scope of the appended claims are intended to be included in the present invention.

We claim:

1. In a movement detecting device comprising a light transmitter and a light receiver spaced therefrom, a first stationary apertured plate having an aperture therein is associated with the light transmitter and a second stationary apertured plate having an aperture therein is associated with the light receiver, said first and second stationary apertured plates being amounted in a body and an apertured movable plate interposed between the first and second stationary apertured plates, the improvement wherein the first and second stationary apertured plates are unitarily connected together so that the apertures in each said first and second apertured plate are aligned with one another prior to mounting in said body whereby light from the transmitter may be accurately received by the light receiver.

2. A device according to claim 1 wherein the first and second stationary apertured plates are integrally formed from a single sheet of material.

3. A device according to claim 1 wherein said first and second stationary apertured plates are formed into a U-shape.

4. A device according to claim 3 wherein at least one pin having a flange defining the spacing between the first and second apertured plates is provided.

5. A device according to claim 1 where the first and second apertured plates are two discrete stationary apertured plates which are unitarily secured together by at least one pin having a flange defining the spacing between said apertured plates.

6. A device according to claim 5 wherein a portion of said at least one pin is swaged over part of an outer surface of each apertured plate to thereby secure said aperture plates together.

7. A device according to claim 5 wherein securing means are provided for securing said apertured plates to said pin, said securing means including one of a weld, epoxy adhesive, and at least one pressure ring located about the pin for forcing said apertured plates on to said flange.

8. A device according to claim 4 wherein each said apertured plate is substantially rectangular in shape and two pins are located at adjacent corners of each said apertured plate.

9. A device according to claim 1 wherein the first and second apertured plates each have outwardly turned flanges extending away from the opposing apertured plate.

10. A device according to claim 9 wherein the flanges have cut outs therein for assisting in bonding the apertured plate associated therewith to the body, which said body is molded over said flanges.

11. A device according to claim 1 wherein the first and second apertured plates have a plurality of holes in the major surfaces thereof for relaxing strain when said first and second apertured plates are molded into said body.

12. A device according to claim 1 wherein a sub assembly is formed by said unitarily assembled first and second apertured plates and a molded body over the outer surface of said first and second apertured plates.

13. A device acording to claim 12 wherein said body has location apertures for locating the light transmitter and the light receiver respectively.

14. A device according to claim 12 wherein the sub assembly is molded in a support housing.

15. A device according to claim 1 wherein more than one light transmitter and associated light receiver is provided, each light transmitter and light receiver having associated sets of apertures in the first and second stationary apertured plates and said movable plate.

16. A device according to claim 1 wherein the movable plate is pivoted to be at least partially rotatable about an axis.

17. A device according to claim 16 wherein the spacing between the first and second apertured plates is only sufficient to permit movement of said movable plate.

18. A movement detecting device comprising a light transmitter and a light receiver spaced therefrom, a first stationary apertured plate having an aperture therein associated with the light transmitter and a second stationary apertured plate having an aperture therein associated with the light receiver, said first and second stationary apertured plates being unitarily connected together so that the apertures in each said first and second apertured plate are aligned with one another, said first and second apertured plates forming a subassembly, a body molded over the outer surface of said first and second apertured plates, and an apertured movable plate interposed between the first and second stationary apertured plates whereby light from the light transmitter may be accurately received by the light receiver.

19. An internal combustion engine ignition distributor having a movement detecting device comprising a light transmitter and a light receiver spaced therefrom, a first stationary apertured plate having an aperture therein associated with the light transmitter and a second stationary apertured plate having an aperture therein associated with the light receiver, said first and second stationary apertured plates being mounted in a body and an apertured movable plate interposed between the first and second stationary apertured plates, said first and second stationary apertured plates being unitarily connected together so that the apertures in each said first and second apertured plate are aligned with one another prior to mounting in said body whereby light from the transmitter may be accurately received by the light receiver.

20. A fluid regulating flow detector having a movement detecting device comprising a light transmitter and a light receiver spaced therefrom, a first stationary apertured plate having an aperture therein associated with the light transmitter and a second stationary apertured plate having an aperture therein associated with the light receiver, said first and second stationary apertured plates being mounted in a body and an apertured movable plate interposed between the first and second stationary apertured plates, said first and second stationary apertured plates being unitarily connected together so that the apertures in each said first and second apertured plate are aligned with one another prior to mounting in said body whereby light from the transmitter may be accurately received by the light receiver.

* * * * *